United States Patent
Geissler

(10) Patent No.: US 10,730,378 B2
(45) Date of Patent: Aug. 4, 2020

(54) FOLDING TOP COMPARTMENT LID

(71) Applicant: Bayerische Motoren Werke Aktiengesellschaft, Munich (DE)

(72) Inventor: Andreas Geissler, Munich (DE)

(73) Assignee: Bayerische Motoren Werke Aktiengesellshaft, Munich (DE)

( * ) Notice: Subject to any disclaimer, the term of this patent is extended or adjusted under 35 U.S.C. 154(b) by 95 days.

(21) Appl. No.: 16/127,970

(22) Filed: Sep. 11, 2018

(65) Prior Publication Data

US 2019/0009658 A1   Jan. 10, 2019

Related U.S. Application Data

(63) Continuation of application No. PCT/EP2017/055865, filed on Mar. 13, 2017.

(30) Foreign Application Priority Data

Mar. 16, 2016 (DE) ........................ 10 2016 204 350

(51) Int. Cl.
*B60J 7/20* (2006.01)
(52) U.S. Cl.
CPC ..................... *B60J 7/202* (2013.01)
(58) Field of Classification Search
CPC ............. B60J 7/20; B60J 7/202; B60J 7/203
USPC .................................................. 296/107.08
See application file for complete search history.

(56) References Cited

U.S. PATENT DOCUMENTS

| | | | | |
|---|---|---|---|---|
| 3,053,567 A | * | 9/1962 | Geiger | B60J 7/202 296/107.08 |
| 5,743,587 A | * | 4/1998 | Alexander | B60J 7/145 296/108 |
| 6,145,915 A | * | 11/2000 | Queveau | B60J 7/202 296/107.08 |
| 8,459,719 B2 | * | 6/2013 | Schulzki | B60J 7/0053 280/756 |
| 2002/0135201 A1 | * | 9/2002 | Liedmeyer | B60J 7/1855 296/107.17 |
| 2003/0080581 A1 | * | 5/2003 | Quindt | B60J 7/202 296/107.08 |

(Continued)

FOREIGN PATENT DOCUMENTS

DE  697 01 655 T2   8/2000
DE  100 39 683 A1   3/2002

(Continued)

OTHER PUBLICATIONS

International Search Report (PCT/ISA/210) issued in PCT Application No. PCT/EP2017/055865 dated Jun. 30, 2017 with English translation (four (4) pages).

(Continued)

*Primary Examiner* — Dennis H Pedder
(74) *Attorney, Agent, or Firm* — Crowell & Moring LLP

(57) ABSTRACT

A folding top compartment lid for closing an opening in a folding top compartment of a cabriolet consists at least of a bodyshell component and a self-supporting mounted part. The self-supporting mounted part adjoins the bodyshell component in such a way that the bodyshell component on its own closes a section of the opening in the folding top compartment and the mounted part on its own closes a section of the opening in the folding top compartment.

10 Claims, 2 Drawing Sheets

(56) References Cited

U.S. PATENT DOCUMENTS

| | | | | |
|---|---|---|---|---|
| 2003/0227189 A1* | 12/2003 | Russke | ................... | B60J 7/205 |
| | | | | 296/76 |
| 2006/0175864 A1* | 8/2006 | Telehowski | ............... | B60J 7/20 |
| | | | | 296/107.08 |
| 2010/0176622 A1* | 7/2010 | Fallis, III | .............. | B60J 7/1226 |
| | | | | 296/107.08 |

FOREIGN PATENT DOCUMENTS

| | | |
|---|---|---|
| DE | 699 03 212 T2 | 2/2003 |
| DE | 202 08 001 U1 | 11/2003 |
| DE | 20 2005 002 887 U1 | 5/2005 |
| DE | 10 2005 036 380 A1 | 2/2007 |
| DE | 10 2006 044 974 A1 | 4/2008 |
| DE | 10 2009 040 609 A1 | 3/2011 |
| EP | 0 863 034 B1 | 10/2003 |
| EP | 1 369 277 B1 | 5/2015 |

OTHER PUBLICATIONS

German-language Search Report issued in counterpart German Application No. 102016204350.1 dated Feb. 17, 2017 with partial English translation (13 pages).

\* cited by examiner

FOLDING TOP COMPARTMENT LID

CROSS REFERENCE TO RELATED APPLICATIONS

This application is a continuation of PCT International Application No. PCT/EP2017/055865, filed Mar. 13, 2017, which claims priority under 35 U.S.C. § 119 from German Patent Application No. 10 2016 204 350.1, filed Mar. 16, 2016, the entire disclosures of which are herein expressly incorporated by reference.

BACKGROUND AND SUMMARY OF THE INVENTION

The present invention relates to a folding top compartment lid for a convertible vehicle.

A known folding top compartment lid closes a folding top compartment opening of a convertible vehicle both when the folding top is open and when the folding top is closed, the folding top compartment lid being opened to fold up or open out the folding top. Conventionally, the folding top compartment lid is a component of what is known as a vehicle bodyshell, which undergoes a coating process together with the vehicle body. In this case, the folding top compartment lid is a body component comprising two shells, an outer shell and an inner shell, which provide the folding top compartment lid with sufficient rigidity. On a region of an outer face of the folding top compartment lid, which region is used as a rear shelf when the folding top is closed and is thus a component of the interior, a plastics cover, which is optionally additionally covered with leather, can be provided. The inner shell and the outer shell are conventionally produced from a metal material, for example steel. DE 20 2005 002 887 U1 additionally discloses a folding top compartment lid which consists of two shells, an outer shell and an inner shell, which are produced from a glass-fiber-reinforced thermoset.

In the folding top compartment lid consisting of two shells, hinges are suitably fastened to the inner shell for a hinged connection to the vehicle body.

Furthermore, it is known for a folding top compartment lid to be made from a multilayer composite component, as disclosed in DE 10 2005 036 380 A1 and in DE 10 2009 040 609 A1.

In the case of a composite component of this type, however, it is difficult to connect a hinge part on the folding top compartment lid side.

The problem addressed by the present invention is thus that of providing a folding top compartment lid for closing a folding top compartment opening of a convertible vehicle, in which the folding top compartment lid is sufficiently rigid and light, and in which a hinge connection can be achieved in a simple manner.

This problem is solved by a folding top compartment lid according to the present invention for closing a folding top compartment opening of a convertible vehicle, the folding top compartment lid comprising at least a bodyshell component and a self-supporting mounted part. The self-supporting mounted part is connected to the bodyshell component in such a way that the bodyshell component on its own closes a region of the folding top compartment opening, and the mounted part on its own closes a region of the folding top compartment opening.

In other words, the bodyshell component and the mounted part overlap at most to a limited extent and thus each close only part of the folding top compartment opening.

In this context, self-supporting means that said part withstands stress by a person who sits on the folding top compartment lid when the folding top is open, for example.

According to the invention, a portion of the bodyshell of the folding top compartment lid can thus be suitably made smaller without the overall rigidity of the folding top compartment lid being reduced, and the bodyshell component can be connected to the body in a known manner by way of a known hinge connection. Moreover, the mounted part can already be provided with a desired surface without an additional component which forms a surface of the folding top compartment lid having to be mounted on the bodyshell component. In other words, the component which forms a surface is itself a supporting component of the folding top compartment lid, so that a bodyshell component of the folding top compartment lid can have a smaller and lighter design, and the folding top compartment lid can thus have a lighter design overall as well. By decreasing the size of the bodyshell component, additional installation space can further be provided in the region of the mounted part.

The mounted part can advantageously be able to be mounted on the bodyshell component after a process of coating the bodyshell component.

According to one preferred development of the present invention, in the folding top compartment lid the bodyshell component is formed comprising at least two shells: an inner, that is to say lower, shell, and an outer, that is to say upper, shell. The inner shell and the outer shell form a cavity or a plurality of cavities therebetween.

By means of the two shells, sufficient rigidity of the bodyshell component can be achieved.

Furthermore, a hinge part can be attached to the bodyshell component, in particular to the outer shell.

The inner shell and the outer shell can be made of a plastics material, in particular a fiber-reinforced plastics material, or a metal material, in particular steel or aluminum or an aluminum alloy.

The outer shell can here be a component of a vehicle outer skin. In particular, the outer shell can here be a visible component of the vehicle outer skin when the folding top is closed.

The inner shell and the outer shell can be interconnected for example by adhesive bonding, welding or a screw connection.

The mounted part can preferably be made of a composite material.

Making the mounted part from a composite material makes it possible for the part to be formed as a single piece. Furthermore, the mounted part can have a low weight while being sufficiently rigid.

The mounted part here is advantageously formed in multiple layers, in particular in the manner of a sandwich.

As a result, the rigidity of the mounted part can be further increased while maintaining a low weight.

According to one preferred development of the folding top compartment lid, the mounted part here can comprise an inner supporting layer, an outer supporting layer and a spacer layer which is arranged between the inner supporting layer and the outer supporting layer. The spacer layer can be made for example of a foamed material or a material having a honeycomb structure.

Preferably, the mounted part comprises an outer, that is to say upper, decorative layer.

The decorative layer is preferably formed in a region of the folding top compartment lid which is located inside the vehicle interior, i.e. under the folding top, when the folding top is closed.

Such a region preferably forms what is known as a rear shelf when the folding top is closed. In other words, the mounted part preferably forms a rear shelf or a rear shelf region.

According to one preferred development, the mounted part can substantially close a region of a folding top compartment opening which is located inside or under the folding top, that is to say inside the vehicle interior, when the folding top is closed.

The bodyshell component can thus suitably be in the form of a vehicle outer skin component, and the mounted part can suitably be in the form of a rear shelf or component of the interior of the vehicle.

According to one preferred development of the folding top compartment lid according to the invention, the bodyshell component has a main portion which extends in the transverse direction of the vehicle, and two limb portions which extend from lateral end portions of the main portion substantially in the longitudinal direction of the vehicle—when the folding top compartment lid is closed.

In other words, in a plan view, the bodyshell component is substantially U-shaped, the mounted part being arranged between the main portion and the two limb portions.

Advantageously, the mounted part is rigidly mounted on the bodyshell component.

In other words, the mounted part is fastened to the bodyshell component in a fixed manner, that is to say in a substantially immovable manner. Advantageously, there is no hinged connection between the mounted part and the bodyshell component.

For example, the mounted part is connected to the bodyshell component by means of a bolt connection, e.g. a screw connection or a rivet connection, and/or an integrally bonded connection, e.g. by means of adhesive bonding or welding.

Preferably, the folding top compartment lid can be mounted on a convertible vehicle which, in addition to the folding top compartment lid, comprises a hatchback lid for opening and closing a luggage compartment or loading space. The folding top compartment lid and the hatchback lid can be directly adjacent to one another.

The abovementioned developments of the invention can be combined with one another as desired to the extent that is possible and appropriate.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed description of an exemplary embodiment of the present invention with reference to FIGS. 1 to 4 follows.

Figure 1:
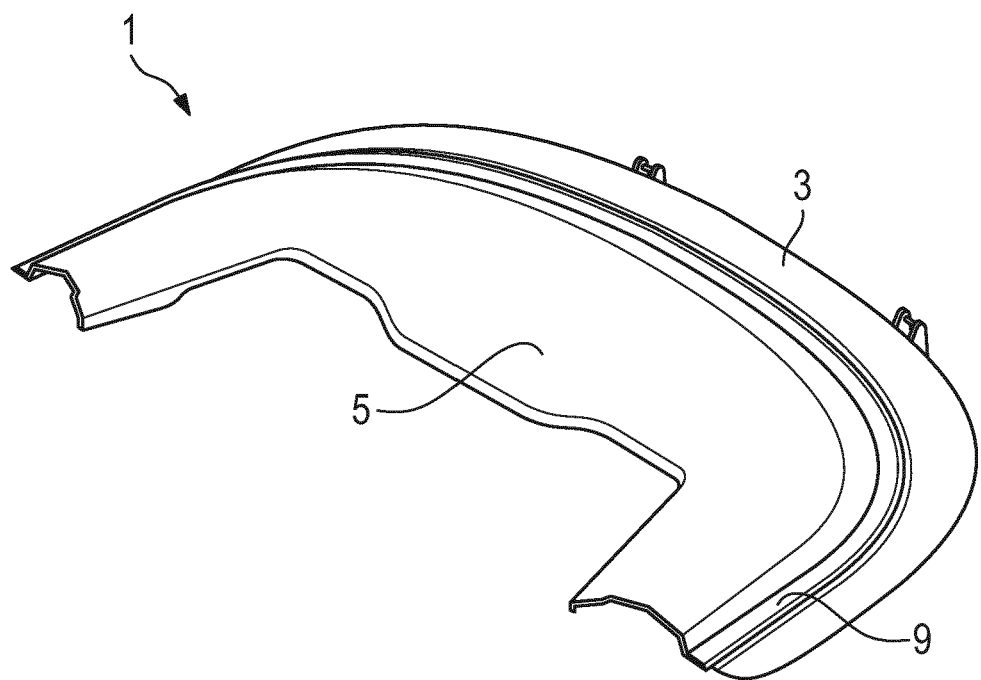
FIG. 1 is a schematic perspective view of a folding top compartment lid according to an exemplary embodiment of the present invention.
Figure 2:
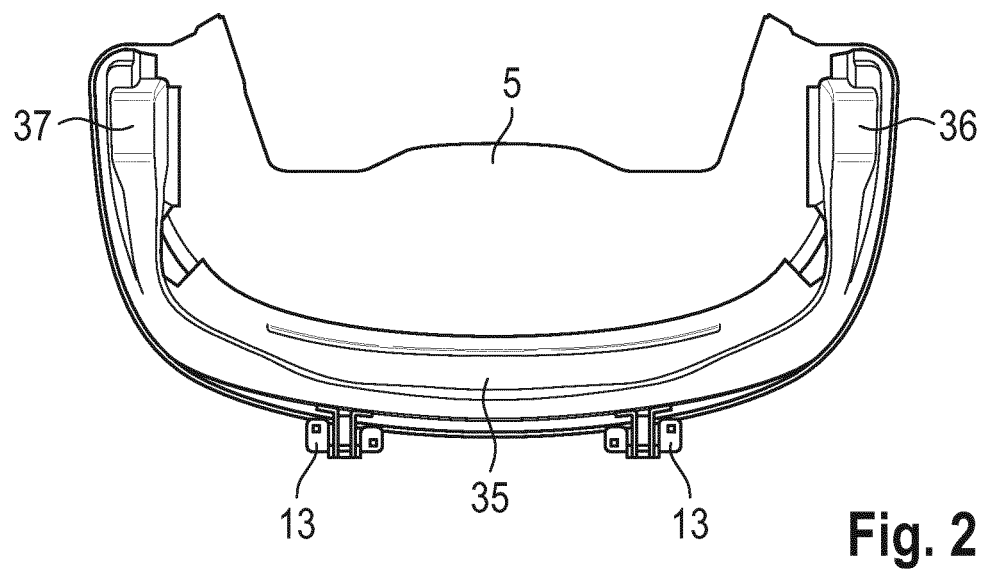
FIG. 2 is a schematic plan view of a lower face of the folding top compartment lid according to the exemplary embodiment of the present invention.

A folding top compartment lid 1 of a convertible vehicle according to the exemplary embodiment of the present invention, as shown in FIGS. 1 and 2, substantially consists of a U-shaped bodyshell component 3 and a mounted part 5 which is mounted thereon. The mounted part 5 here is mounted on the bodyshell component 3 in the region between a base part 35 and limbs 36 and 37 of the bodyshell component 3. The bodyshell component 3 and the mounted part 5 overlap here only in a small region. In the region of a transition between the bodyshell component 3 and the mounted part 5, a cover 9 is attached. The mounted part 5 forms a rear shelf of the vehicle, which is located behind the single row of seats or, in a vehicle comprising a plurality of rows of seats, behind the last row of seats of the vehicle. The bodyshell component 3 forms an outer skin component of the vehicle body.

Figure 3:
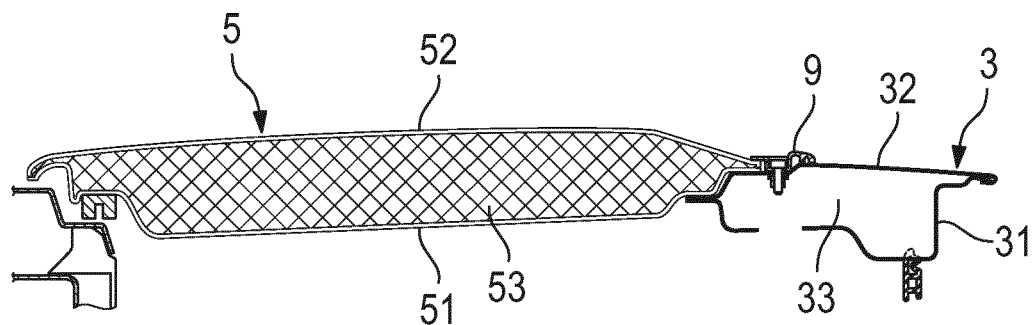
FIG. 3 is a schematic sectional side view of the folding top compartment lid according to the exemplary embodiment of the present invention.
Figure 4:
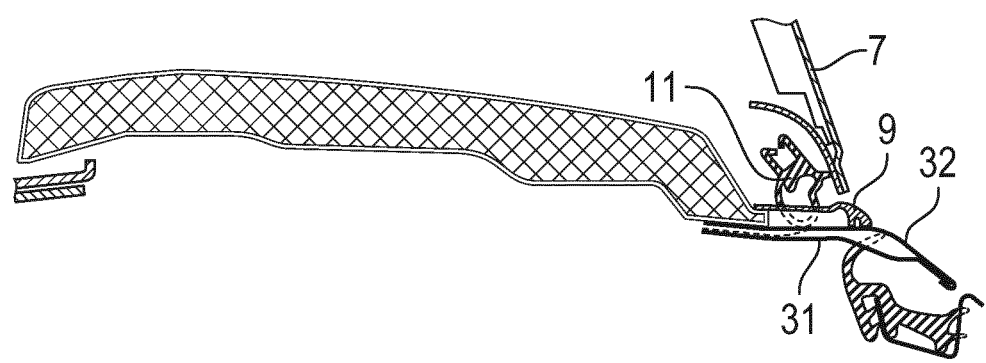
FIG. 4 is another schematic sectional side view of the folding top compartment lid according to the exemplary embodiment of the present invention.

As can be seen from the sectional views in FIGS. 3 and 4 of the folding top compartment lid 1, the bodyshell component 3 substantially consists of a lower, that is to say inner, shell 31, and an upper, that is to say outer, shell 32. The outer shell 32 here forms the body outer skin and is visible from the outside when the folding top is closed. The two shells 31 and 32 are interconnected by welding, screwing or adhesive bonding, with a cavity 33 being formed between the lower shell 31 and the upper shell 32. This two-shell construction allows sufficient rigidity of the bodyshell component 3.

Hinge parts 13 are additionally attached in a known manner to the bodyshell component 3, in particular the lower shell 31.

The mounted part 5 is a component produced in the manner of a sandwich type of construction, which consists of a lower layer 51, an upper layer 52, and a spacer layer 53 which is arranged therebetween. The individual layers 51, 52, 53 here are joined face to face and in an integrally bonded manner. The lower layer 51 and the upper layer 52 can here be produced from a fiber-reinforced plastics material. The spacer layer 53 is preferably made of a foamed material or a honeycomb-shaped material so that the spacer layer is sufficiently light. The spacer layer 53 has the function of producing a spacing between the lower layer 51 and the upper layer 52, the purpose of which layers 51 and 52 is to provide the actual support and rigidity.

As shown in FIGS. 3 and 4, the mounted part 5 overlaps the bodyshell component 3 to only a minor extent, and therefore the mounted part 5 on its own closes a relatively large region of the folding top compartment opening, and likewise the bodyshell component 3 on its own closes a relatively large region of the folding top compartment opening.

As a result of the inherent rigidity and self-supporting property of the mounted part 5 and the connection to the U-shaped bodyshell component 3, in the region of the mounted part 5 the folding top compartment lid 1 is sufficiently stiff for people to be able to sit thereon, if necessary.

FIG. 4 additionally shows a small part of the closed folding top 7, the lower edge of which, in the connection region between the bodyshell component 3 and the mounted part 5, can be sealed on the bodyshell component 3, or on a cover 9 which is attached thereto, by use of a seal 11.

When producing the convertible vehicle comprising the folding top compartment lid 1, the bodyshell component 3 is firstly fastened to the vehicle body by the hinges 13 and then undergoes a coating process, in particular a dip coating process, together with the entire vehicle body. After the coating process, the mounted part 5, which is already prepared and provided with a suitable surface, is mounted on the coated bodyshell component 3 by means of screws or the like.

Together, the bodyshell component 3 and the mounted part 5 form a sufficiently rigid folding top compartment lid 1, which additionally has a low weight. The hinge connection can be achieved in the same manner as in a known folding top compartment lid, which consists merely of a bodyshell component as a supporting component. An additional cover in the rear-shelf region can be omitted, since the mounted part takes on this function. In other words, the mounted part forms a cover and rear shelf, which additionally has a self-supporting function, so that the bodyshell component can have a smaller design overall.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A folding top compartment lid for closing a folding top compartment opening of a convertible vehicle, comprising:
    a bodyshell component; and
    a self-supporting mounted part which is connected to the bodyshell component such that the bodyshell component on its own closes a region of the folding top compartment opening, and the mounted part on its own closes a region of the folding top compartment opening, wherein
    the mounted part is rigidly mounted on the bodyshell component,
    the bodyshell component comprises at least two shells, an inner shell and an outer shell, which form at least one cavity therebetween, and
    the mounted part is made of a composite material comprising an integrally bonded inner supporting layer, outer supporting layer and spacer layer arranged between the inner supporting layer and the outer supporting layer.

2. The folding top compartment lid as claimed in claim 1, wherein
    the inner and outer shells are made of a plastics material or a metal material.

3. The folding top compartment lid as claimed in claim 2, wherein
    the plastic material is a fiber-reinforced plastics material.

4. The folding top compartment lid as claimed in claim 2, wherein the metal material is steel or aluminum or an aluminum alloy.

5. The folding top compartment lid as claimed in claim 1, wherein
    the spacer layer is made of a foamed material or is in a form of a honeycomb structure.

6. The folding top compartment lid as claimed in claim 1, wherein
    the outer supporting layer forms an outer decorative layer.

7. The folding top compartment lid as claimed in claim 1, wherein
    the mounted part substantially closes a region of a folding top compartment opening which is located inside the folding top when said folding top is closed.

8. The folding top compartment lid as claimed in claim 7, wherein
    the bodyshell component substantially closes a region of a folding top compartment opening which is located outside the folding top when said folding top is closed.

9. The folding top compartment lid as claimed in claim 1, wherein
    the bodyshell component substantially closes a region of a folding top compartment opening which is located outside the folding top when said folding top is closed.

10. The folding top compartment lid as claimed in claim 1, wherein
    the bodyshell component comprises a main portion which extends in a transverse direction of the vehicle, and two limb portions which extend from lateral end portions of the main portion substantially in a longitudinal direction of the vehicle, and
    the mounted part is arranged between the main portion and the two limb portions.

* * * * *